Feb. 24, 1948.        J. H. LINCOLN ET AL        2,436,439
                      CAPSULATING APPARATUS
                      Filed Aug. 15, 1944        2 Sheets-Sheet 1
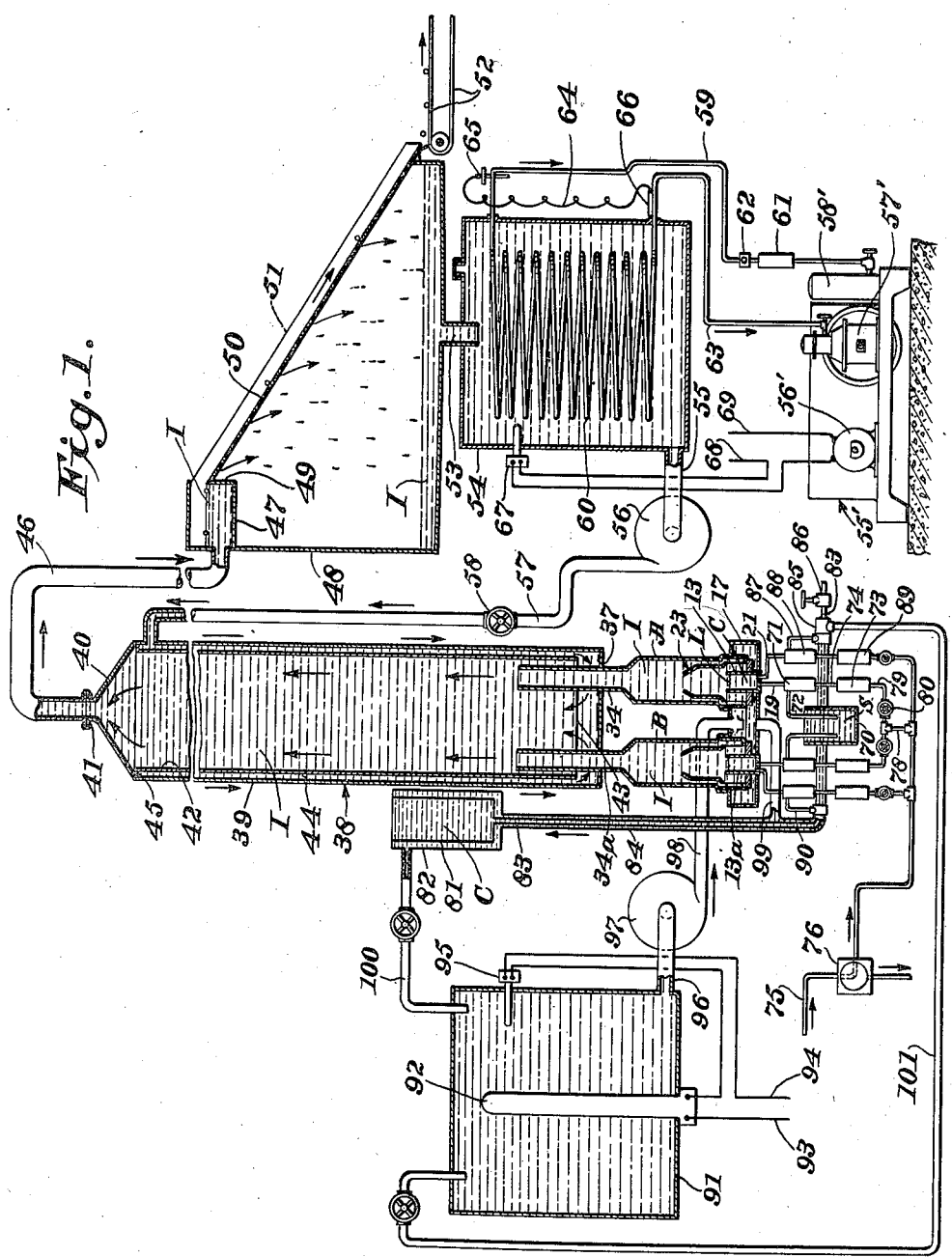
Inventors:
John H. Lincoln,
Lyle E. Branchflower,
By Cushman Darby & Cushman
                Attorneys.

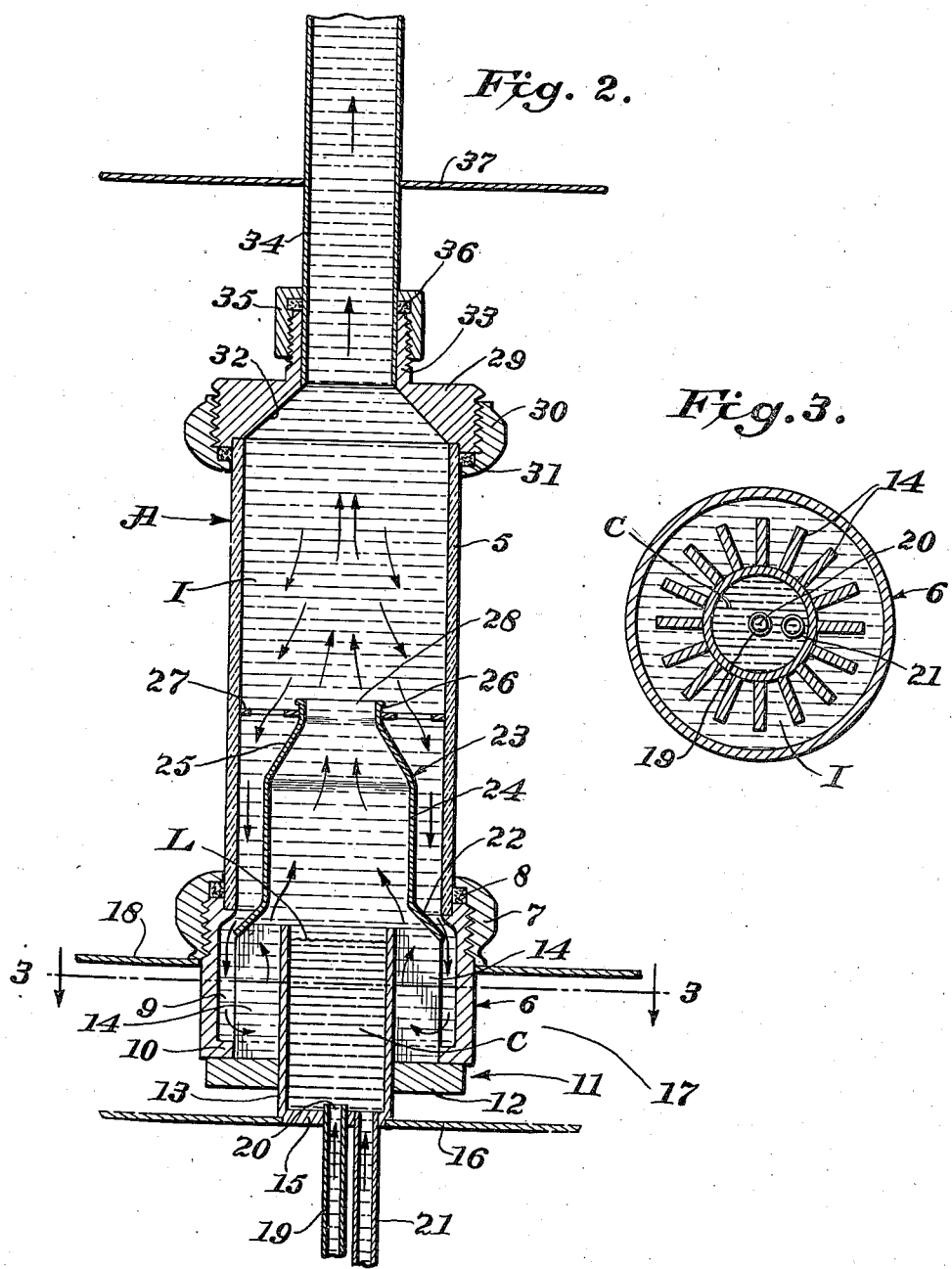

Patented Feb. 24, 1948

2,436,439

UNITED STATES PATENT OFFICE 2,436,439

CAPSULATING APPARATUS

John H. Lincoln and Lyle E. Branchflower, Seattle, Wash., assignors to Laucks Laboratories, Inc., Seattle, Wash., a corporation of Washington Application August 15, 1944, Serial No. 549,562

15 Claims. (Cl. 18—1)

This invention relates to apparatus for making capsules filled with a liquid content substance to the exclusion of air, the capsules being characterized by having a seamless covering or skin, being or regular form, and with the percentage of capsulated material to the content substance at a minimum.

In accordance with the invention, the liquid content substance is introduced in the form of measured drops into a body of liquid capsulating material, ordinarily gelatin. The drops of content substance are of a specific gravity with reference to that of the capsulating material such that they will rise through the latter while gathering a covering thereof. Above the capsulating material is a body of immiscible liquid through which the covered drops will rise, passing an interface between the capsulating material and the immiscible liquid. The latter is hardening as to the capsulating material and is of sufficient depth so that when the capsules arrive at the top thereof, the capsulating material is hardened and the capsules can be continuously removed to be ultimately packaged. In the case of a capsulating material, such as gelatin, which is maintained in the liquid state by heating it, the immiscible liquid is suitably cooled so as to produce the hardening or solidifying effect.

A general object of the invention is to provide a system which is efficient and continuous in operation. Subsidiary objects are to minimize turbulence at the interface so as to eliminate, as far as possible, the danger of rupture or deformation of the capsules in passing therethrough; to provide means for accurately maintaining the temperatures of the capsulating material and of the immiscible liquid; to provide for the maintenance of a substantially constant volume of the capsulating material; and, where the capsulating material, as is the case with gelatin, deteriorates upon prolonged subjection to liquefying heat, to provide against this danger.

These objects, and others, are attainable in the use of apparatus such as is shown by way of example in the accompanying drawings in which:

Figure 1 is a schematic view of a system in accordance with the invention, the parts largely appearing in vertical section.

Figure 2 is a vertical section on an enlarged scale of apparatus appearing in Figure 1, and Figure 3 is a section on line 3—3 of Figure 2.

Referring to Figure 2, reference numeral 5 designates a vertically disposed glass tube whose lower end is secured to a tubular fitting 6 by means of a clamping ring 7 and gasket 8, member 6 having an inner peripheral enlargement 9 with a cylindrical wall coaxial with the tube 5.

Secured against the bottom of the flange 10 of member 6 is a fitting 11 having a horizontal wall 12 which closes the space between member 6 and a cylindrical cup 13 which is set in the wall 12. Cup 13 is coaxial with member 6 and terminates upwardly substantially at the upper end of the enlargement 9. The cup is provided externally with a number of axially extending heat conducting fins 14 which extend from its upper end to the top surface of wall 12. The bottom portion of the cup projects below the lower surface of wall 12 and includes a bottom wall 15 which is set in the bottom wall 16 of a closed tank 17, see also Figure 1, whose top wall 18 has an opening in which the member 6 is received and supported. A tube 19 for the supply of liquid content substance is led centrally through wall 15 and defines a central supply orifice 20. A similar tube 21 is led eccentrically through bottom 15 for the supply of liquid capsulating material and by means which will be later described the capsulating material C is supplied in a manner to maintain a substantially constant level L in the cup.

The upper edges of fins 14 are inclined downwardly and outwardly and serve to support the lower downwardly and outwardly conically flared portion 22 of a tubular deflector 23. The latter is in the general form of an inverted funnel including an intermediate cylindrical portion 24 above the flared portion 22, a tapered conical portion 25 above the cylindrical portion, and a terminal cylindrical neck 26 engaged in a spider 27 which maintains the deflector in coaxial relation with tube 5. It will be noted that the deflector is peripherally spaced throughout within tube 5 and that its lower edge is spaced outwardly of cup 13. The internal diameter of the cylindrical portion 24 is substantially greater than the outer diameter of the cup, while the terminal opening 28 is somewhat smaller than the mouth of the cup.

Reference numeral 29 designates an adapter secured to the upper end of tube 5 by a clamping ring 30 and a gasket 31, the adapter having an upwardly tapering inner conical surface 32 leading to a coaxial neck 33 in which is received coaxial tube 34 sealed to the neck by means of a clamping ring 35 and a gasket 36. The tube 34, which completes what we will term a base unit A, projects upwardly through the bottom wall 37 of a tank 38, see also Fig. 1. The internal diameter of tube 34 is about the same as that of the cup 13.

Referring to Figure 1, tank 38 includes a vertically disposed cylindrical shell 39 closed at its top by a conical cover 40 having a central outlet neck 41. Within the tank is an imperforate cylindrical curtain 42 which extends from the top of the tank to a point well below the top of tube 34, the lower edge of the curtain being indicated by the reference numeral 43. The curtain is in peripherally spaced relation to the shell 39 and the annular space or chamber 44 between the two is closed at the top by a flange 45 which serves to support the curtain. It will be seen that the tube 34 is passed eccentrically through the bottom of the tank, and that on the same diameter and in symmetrical disposition the tube 34ᵃ of another identical base unit B is passed through the tank bottom. Two units are shown by way of example. A single unit could, of course, be used or as many more as may be required to give the required output. The lower part of unit B is in the tank 17.

A pipe 46 is connected to the neck 41 and leads to an open topped receptacle 47 supported in the upper end of a tank 48, the receptacle having an overflow wall 49 from the horizontal edge of which a screen 50 is inclined downwardly between the tank side walls, as at 51, to extend over the tank end wall 48' and terminate above a conveyor 52. A drain connection 53 extends from the bottom of tank 48 through the top of a closed tank 54. Tank 54 has a bottom outlet 55 extending to the intake of a pump 56 whose outlet is connected through a pipe 57 and interposed control valve 58 into the upper end of chamber 44.

Reference numeral 55' designates a motor-compressor unit comprising the electric motor 56' arranged to drive the compressor 57'. The compressor output goes through a pipe 59 to one end of a coil 60 in tank 54. Reference numeral 58' designates the air storage chamber. Interposed in pipe 59 is a moisture scavenger 61 and a sight-glass 62. The other end of coil 60 is connected by a pipe 63 to the compressor intake. Reference numeral 64 designates a capillary tube running from an expansion valve 65 in pipe 59 to a thermostatic bulb 66 associated with pipe 63, the bulb controlling the flow of refrigerant in the system by acting on the expansion valve through tube 64, opening the expansion valve to allow a large flow of refrigerant in starting and under operating conditions controlling the supply of refrigerant required to carry the load. Reference numeral 67 designates a thermostatic switch whose thermo element is in the tank 54, the switch controlling the supply of current to the motor 56' from conductors 68 and 69.

Reference numeral 70, Figure 1, designates a container for a liquid content substance S, the substance being withdrawn from the container by a pump 71 through a tube 72 and the pump outlet being in connection with the tube 19. As here indicated, pump 71 is of the reciprocating type and is driven from a power cylinder 73 by a piston rod 74, the stroke of the piston being infinitely adjustable so that the pump will be caused to deliver extremely accurately metered drops from the orifice 20 into the body of capsulating material C in the cup 13.

Reference numeral 75 designates a pipe leading from a source of fluid pressure through a valve 76 and connections 78 and 79, the latter including a shut-off valve 80, to the cylinder 73. It will be noted that identical delivery means are provided for the unit B.

Reference numeral 81 designates a reservoir for the capsulating material C, the reservoir being housed in a jacket 82. A tube 83 extends downwardly from the bottom of the reservoir and horizontally below tank 17, the tube being surrounded by a conduit 84 in connection with jacket 82 and terminating in a fitting 85 through a packing of which the extremity of tube 83 projects and is equipped with a valve 86.

Just in advance of the fitting 85 a tube 87 is led from tube 83 through a packing in conduit 84 to the intake side of a metering pump 88 which is exactly like pump 71 and is driven in the same manner from a power cylinder 89 in connection with pipe 75. Reference numeral 90 designates a branch from tube 83 to the metering pump for unit B.

Reference numeral 91 designates a tank containing a suitable liquid which is heated by an electric heating element 92 in connection with supply conductors 93 and 94, the latter having interposed therein a thermostatic switch 95 whose thermo element is in the tank 91. A connection 96 leads from the bottom of tank 91 to the intake of a circulating pump 97 whose outlet is in connection with tank 17 through a pipe 98. Tank 17 has an outlet pipe 99 in connection with conduit 84. Liquid entering conduit 84 from pipe 99 divides, part going up to jacket 82 and thence through a valved pipe 100 to the top of tank 91, and part returning to the top of tank 91 through a valved pipe 101 which leads from fitting 85.

In order to condition the apparatus for use, a liquid of suitable specific gravity and immiscible with the capsulating material to be used is supplied to the tank 48 through the screen 50, and pump 56 is operated and the supply continued until the system, including tank 54, units A and B, tank 38 and receptacle 47, is filled and a body of the liquid stands in tank 48. The compressor is now started and the liquid in tank 54 is brought to and maintained at the temperature determined by the thermostatic switch 67 and a predetermined temperature is imparted to the immiscible liquid which is designated by the reference letter I.

In the meantime reservoir 82 and tube 83 have been filled with liquid capsulating material, the filling of the tube being permitted by venting through valve 86. The pumps are all at rest. The liquid in tank 91 is heated to the temperature determined by the thermostatic switch 95 and, pump 97 being operated, the heated liquid is circulated through tank 17 and back to the top of tank 91 through the connections previously described. The metering pumps as at 88, i. e., those in connection with tube 83, are now operated, the other pumps remaining at rest, to pump capsulating material into the cups 13 and 13a of the units A and B, displacing the liquid I therefrom until the level L is reached as determined by a timed operation of the pumps. The pumps for the content material are now started and drops are injected into the capsulating material to rise therethrough while gathering a covering thereof, and then to pass through the interface, which is at L, to rise through the liquid I wherein the capsule skin is solidified. The capsules then pass through pipe 46 to receptacle 47 and the flow from the latter over wall 49 carries them onto the screen 50 from which they roll to the conveyor 52 which passes them on for subsequent washing, drying and packaging. The liquid I, of course, returns to tank 48 through the screen 50.

Preferably, when the required level L has been attained in the manner above described, the pumps for the capsulating material are stopped and then are started again simultaneously with the pumps for the content substance. The latter pumps, as has been previously stated, deliver drops or globules of an exact size as determined by the stroke adjustment. These drops will collect, as a seamless covering, a certain quantity of the capsulating material as they rise through the latter to emerge above the interface. Consequently, each time a covered drop leaves the capsulating material, the volume of the latter is depleted by a certain amount. The delivery of the pumps for the capsulating material is so adjusted that the body of capsulating material is replenished by exactly the same amount, and desirably the two pumps are operated in unison so that as a drop of content substance is injected into the capsulating material, a drop of the latter, of the exact size to compensate for the capsulating material which the drop of content substance will gather, is simultaneously injected.

The metering pumps are shown as of a reciprocating type readily obtainable on the market but, of course, any other type of positive delivery means for exactly metered quantities may be used. It is not necessarily essential that the capsulating material be delivered intermittently although this is the preferred manner of delivery since it is much simpler to effect replenishment by measured drops than by continuous flow.

In the use of gelatin solution, the liquefying temperature is maintained as closely as practical to the gel point. For example, with a gelatin having a gel point of 100° F., the temperature of the circulated heating liquid in tank 17 may be such as to maintain the gelatin in the cup 13 at a temperature of 115° F. However, as the heating liquid loses heat in tank 17 and in the return connection which includes the jacket 82, the temperature maintained in the reservoir 81 will be lower and preferably will be no higher than 105° F., and consequently, only the amount of gelatin which is in the cup 13 and directly adjacent thereto is subjected to a relative high temperature which could soon cause deterioration. Such danger is avoided by maintaining as small as a body as possible of the gelatin in the cup so that it will be exhausted before it can deteriorate, such exhaustion occurring, for example, at least three times per hour.

In Figure 2, the unit A is of actual practical size. As to the inner diameter of cup 13, it is only essential that this be sufficient so that the rising nascent capsules will not contact the cup walls and so be subjected to possible damage. The inside diameter of the illustrated cup is ¾", its inside height is 1 7/16" and the depth of the gelatin is 1⅜". The orifice 20 has a diameter of 3/16" and it will be recalled that this orifice is at the center of the bottom wall 15 and delivers vertically. With this arrangement, and in the absence of undue turbulence at the interface, the nascent capsules will rise without contact with the cup walls occurring due to meniscus effect.

As the drop emerges from the orifice 20, the gathered covering momentarily includes a pendant tail which disappears either by distribution or by being withdrawn into the gelatin bath, or both. A symmetrical form is then assumed. In ordinary practice, the depth of the gelatin bath need only be sufficient so that the capsule will have assumed a symmetrical form before reaching the interface. This minimum factor is modified by the fact that with such a shallow bath, which might be as little as ½" in depth, the interface might be too disturbed by the incoming increments delivered through tube 41, and consequently it is desirable to provide a depth of gelatin insuring a quiescent upper stratum of some depth.

In a typical adjustment of pump 71, the drops discharged through the orifice 20 will be about 0.20 gram (approximately 3 grains). The delivered drops can follow one another in quick succession and the amount of gelatin adsorbed and carried out thereby will be such that the illustrated volume of gelatin in the cup will be consumed several times per hour, and consequently no gelatin will remain in the cup long enough to be damaged by the liquefying heat. A drop of content substance of the size above mentioned and its gathered covering will emerge from the interface in perfect spherical form. The drop itself will be in the form of a perfect sphere slightly downwardly offset with respect to the external sphere. Larger drops of content substance may produce an oval or otherwise elongated symmetrical form. In any event, the covering is seamless and of substantially even thickness throughout, which thickness is unusually small so that gelatin consumption is greatly reduced as compared to ordinary prior usage.

We have found that a deflector 23 of the illustrated form and disposition greatly reduces turbulence at the interface. The convection currents established are indicated by the arrows in Figure 2. As will be seen, there is a current downwardly on the outside of the deflector and into the fitting 6, and upwardly between the fins to be deflected by the flare 22 into the interior of the deflector and to converge above the cup. While there is comparative quiescence in the liquid I just above the interface, the emerging capsules soon enter the upward current so as to be assisted in their upward travel. The deflector prevents the occurrence of cross currents above the interface and so eliminates turbulence from such surfaces.

Due to the provision of the curtain 42 in tank 38, the actual inlet to the tank interior for the circulating liquid I is in an annular zone well below the tops of tubes 34 and 34a so that the incoming liquid is rising past the ends of the latter. Due to this arrangement, the emerging capsules are effectively carried upwardly and disturbance in the units A and B is avoided. The temperature at which the liquid is maintained in the tank 38 should, of course, be well below the gel point of the gelatin, for example, 20° F.

Ordinarily gelatin is the capsulating medium employed but any other material of similar character may be used. We may employ polyvinyl alcohol and other equivalent substances where greater strength of the envelope is demanded. The question of toxicity of the capsulating material will, of course, be considered in the capsulating of medicinal preparations but may be disregarded in other uses.

The gelatin used may be a mixture by weight of about 24% U. S. P. gelatin, 11.6% U. S. P. glycerine or propylene glycol, (used as a plasticizer) and 64.4% distilled water (diluent), having a gel point of 100° F., being a tough strong gel at 20° F., and being a free flowing fluid of specific gravity 1.090 at 115° F., which is the temperature in the cup 13. A gelatin with a relatively high gel point, such as mentioned above, is preferred on account of its superior strength.

The invention is principally concerned with the capsulating of medicinal oils such as vitamin rich fish oils, for example, a soup-fin shark liver oil having specific gravity of 0.920 at 70° F. Such oils have a relatively low specific gravity and a definite affinity for gelatin. Other liquids possessing such properties, or an affinity for any other selected capsulating material, may be capsulated in accordance with the invention.

The liquid I may be any non-toxic mixture (assuming the capsulating of medicinal substances) of appropriate specific gravity which is definitely immiscible with the aqueous gelatin solution, and is of low viscosity at the cooling temperature required. (The word "immiscible" as used herein includes the property of inertness with respect to the capsulating material employed.) An example of such a liquid is a mixture of 70% by weight of light petroleum oil (Texaco Corp. Spika Brand, for example) and 30% carbon tetra-chloride (specific gravity adjuster) giving a specific gravity such that the covered drops will readily rise therein. Of course, in the tank 38, the upward current is acting on the capsules. The specific gravity differential is principally relied on in units A and B although, as has been explained, assistance is afforded by the convection currents. In these units, the temperature of the liquid I graduates from that of the capsulating material at the interface to that of the tank 38 at the upper portion of tubes 34 and 34a.

Attention is called to the fact that preventing hydrolytic deterioration in a heated gelatin capsulating medium has proved essential for continuous, commercially successful operation. We have solved this problem by maintaining the storage tank supply at the closest practical temperature to the gel point, this low temperature being effective to prevent deterioration of the supply of gelatin solution. In the capsulating chamber, where a higher temperature (which would soon cause deterioration of the gelatin) must be used to obtain the fluidity required for capsulating, we provide a very small capsulating cup and arrange for its exhaustion and replenishment within a time interval too short to permit injurious deterioration to take place.

The described apparatus is offered by way of example only and it will be obvious that many variations in the form and arrangement of parts are possible. Such variations are contemplated in the claims which follow.

We claim:

1. Capsulating apparatus comprising a vertical tubular member, an upwardly open cup disposed in the lower portion of said member in peripherally spaced relation thereto, means closing the space between said member and cup below the top of the latter, a vertically disposed tubular deflector immediately above said cup peripherally spaced within said tubular member and with its lower edges spaced outwardly of said cup, means for maintaining a substantially constant level of liquid capsulating material in said cup, means for discharging drops of content substance into the capsulating material, and a body of liquid hardening as to said capsulating material in said tubular member and immiscible with said capsulating material and having an interface with said capsulating material, the specific gravities of the content substance, capsulating material and immiscible liquid being such that the drops of content substance will rise through the capsulating mateiral while gathering a covering thereof and the thus constituted pellets will rise through the immiscible liquid.

2. Apparatus according to claim 1 wherein the deflector is in the form of an inverted funnel.

3. Apparatus according to claim 1 wherein the deflector is in the form of an inverted funnel having a top opening somewhat smaller than the top of the cup.

4. Apparatus according to claim 1 wherein the cup is provided externally with longitudinally extending fins.

5. Apparatus according to claim 1 wherein the cup is provided externally with longitudinally extending fins, and wherein the deflector rests on the upper ends of the fins.

6. Apparatus according to claim 1 wherein the deflector has an outwardly flared lower end, a cylindrical intermediate portion larger than the mouth of the cup, and a tapered upper end.

7. Apparatus according to claim 1 wherein the deflector has an outwardly flared lower end, a cylindrical intermediate portion larger than the mouth of the cup, and a tapered upper end defining an opening somewhat smaller than the mouth of the cup.

8. Apparatus according to claim 1 wherein the cup is provided externally with longitudinally extending fins having outwardly and downwardly sloping edges, and wherein said deflector has a flared lower end resting on said edges.

9. Apparatus according to claim 1 wherein the cup is provided externally with longitudinally extending fins having outwardly and downwardly sloping edges, and wherein said deflector has a flared lower end resting on said edges, an intermediate cylindrical portion larger than the mouth of the cup, and a tapered upper end.

10. Apparatus according to claim 1 wherein the cup is provided externally with longitudinally extending fins having outwardly and downwardly sloping edges, and wherein said deflector has a flared lower end resting on said edges, an intermediate cylindrical portion larger than the mouth of the cup, and a tapered upper end defining an opening somewhat smaller than the mouth of the cup.

11. Capsulating apparatus comprising a vertical tubular member, an upwardly open cup disposed in the lower portion of said tubular member in peripherally spaced relation thereto, means closing the space between said member and cup below the top of the latter, a vertical tubular deflector immediately above said cup peripherally spaced within said tubular member and with its lower edge spaced outwardly of said cup, a tank into the bottom of which the upper end of said tubular member is connected, means for maintaining a substantially constant level of liquid capsulating material in said cup, means for discharging drops of content substance into the capsulating material, and a body of liquid hardening as to said capsulating material in said tank and tubular member and immiscible with said capsulating material and having an interface with said capsulating material, the specific gravities of the content substance, capsulating material, and immiscible liquid being such that the drops of content substance will rise through the capsulating material while gathering a covering thereof and the thus constituted pellets will rise through the immiscible liquid.

12. Capsulating apparatus comprising a vertical tubular member, an upwardly open cup disposed in the lower portion of said tubular member in peripherally spaced relation thereto, means closing the space between said member and cup below the top of the latter, a vertical tubular deflector immediately above said cup peripherally spaced within said tubular member and with its lower edge spaced outwardly of said cup, a tank into the bottom of which the upper end of said tubular member is connected, said upper end being reduced in cross sectional area above the top of said deflector, means for maintaining a substantially constant level of liquid capsulating material in said cup, means for discharging drops of content substance into the capsulating material, and a body of liquid hardening as to said capsulating material in said tank and tubular member and immiscible with said capsulating material and having an interface with said capsulating material, the specific gravities of the content substance, capsulating material, and immiscible liquid being such that the drops of content substance will rise through the capsulating material while gathering a covering thereof and the thus constituted pellets will rise through the immiscible liquid.

13. Capsulating apparatus comprising a vertical tubular member having in its lower portion a body of liquid capsulating material which will harden upon cooling, means for discharging drops of a content substance into said material, a tank through and above the bottom of which the upper end of said member projects, a body of liquid in said tubular member and tank immiscible with said capsulating material and having an interface with said capsulating material; and a circulating system for said liquid including an outlet at the top of the tank, cooling means, and a peripheral inlet adjacent the bottom of the tank below the top of said tubular member; the specific gravities of the content substance, capsulating material and immiscible liquid being such that the drops of content substance will rise through the capsulating material while gathering a covering thereof and the thus constituted pellets will rise through the immiscible liquid.

14. Capsulating apparatus comprising a vertical tubular member having in its lower portion a body of liquid capsulating material which will harden upon cooling, means for discharging drops of a content substance into said material, a vertically elongated tank through and above the bottom of which the upper end of said member projects, an imperforate tubular curtain extending from the top of the tank and terminating above the bottom thereof below the top of said tubular member, said curtain defining with the tank side walls a circular chamber closed at its top, a body of liquid in said tank immiscible with said capsulating material and having an interface with said capsulating material; and means for withdrawing said liquid from the top of the tank, cooling it, and returning it to the top of said chamber; the specific gravities of the content substance, capsulating material, and immiscible liquid being such that the drops of content substance will rise through the capsulating material while gathering a covering thereof and the thus constituted pellets will rise through the immiscible liquid.

15. Capsulating apparatus comprising a vertical tubular member, an upwardly open symmetrical cup disposed in the lower portion of said member in peripherally spaced relation thereto, means closing the space between said member and cup below the top of the latter, a vertically disposed tubular deflector immediately above said cup peripherally spaced within said tubular member and with its lower edge spaced outwardly of said cup, means including a supply connection to the bottom part of said cup for maintaining a substantially constant level of liquid capsulating material in said cup, a supply orifice for a content substance in the bottom of the container substantially centrally thereof, means for intermittently supplying content material through said orifice in the form of drops which rise through the capsulating material and gather a covering thereof, the cross-sectional area of said cup being only substantially that necessary to avoid contact by the rising nascent capsules and the depth of the capsulating material being substantially only that necessary to permit the capsules to assume a symmetrical form before reaching the top surface of said material and to repress disturbance of said surface due to input through said supply connection, and a body of liquid hardening as to said capsulating material in said tubular member and immiscible with said capsulating material and having an interface with said capsulating material, said immiscible liquid having a specific gravity such that the covered drops will rise therethrough.

JOHN H. LINCOLN.
LYLE E. BRANCHFLOWER.

REFERENCES CITED

The following references are of record in the file of this patent:

UNITED STATES PATENTS

| Number | Name | Date |
|---|---|---|
| 2,275,154 | Merrill et al. | Mar. 3, 1942 |
| 2,331,572 | Scherer | Oct. 12, 1943 |
| 2,332,671 | Scherer | Oct. 26, 1943 |
| 2,333,433 | Mabbs | Nov. 2, 1943 |
| 2,339,114 | Scherer | Jan. 11, 1944 |
| 2,342,661 | Gunnell | Feb. 29, 1944 |